US007430440B2

(12) United States Patent
Grandhi et al.

(10) Patent No.: US 7,430,440 B2
(45) Date of Patent: Sep. 30, 2008

(54) METHOD AND APPARATUS FOR REDUCING TRANSIENT IMPACTS OF BEAM SWITCHING IN A SWITCHED BEAM ANTENNA SYSTEM

(75) Inventors: Sudheer A. Grandhi, Mamaroneck, NY (US); Janet Stern-Berkowitz, Little Neck, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 629 days.

(21) Appl. No.: 11/019,437

(22) Filed: Dec. 22, 2004

(65) Prior Publication Data

US 2005/0200524 A1 Sep. 15, 2005

Related U.S. Application Data

(60) Provisional application No. 60/542,765, filed on Feb. 6, 2004.

(51) Int. Cl.
*H04M 1/00* (2006.01)

(52) U.S. Cl. ............... 455/562.1; 455/67.11; 455/575.7

(58) Field of Classification Search .............. 455/562.1, 455/12.1, 67.11, 9, 513, 524, 575.7, 114.2, 455/115.3; 370/215, 326, 458, 338, 464
See application file for complete search history.

(56) References Cited

U.S. PATENT DOCUMENTS

| | | | | |
|---|---|---|---|---|
| 2001/0012278 | A1* | 8/2001 | Ma | 370/329 |
| 2002/0111143 | A1* | 8/2002 | Li | 455/67.1 |
| 2003/0228857 | A1* | 12/2003 | Maeki | 455/278.1 |
| 2004/0196834 | A1* | 10/2004 | Ofek et al. | 370/352 |
| 2004/0204114 | A1* | 10/2004 | Brennan et al. | 455/562.1 |
| 2004/0235529 | A1* | 11/2004 | Tarokh et al. | 455/562.1 |
| 2004/0246891 | A1* | 12/2004 | Kay et al. | 370/215 |
| 2006/0003699 | A1* | 1/2006 | Gibson et al. | 455/12.1 |
| 2006/0182077 | A1* | 8/2006 | Scherzer et al. | 370/338 |
| 2007/0161407 | A1* | 7/2007 | Hovers et al. | 455/562.1 |
| 2007/0189325 | A1* | 8/2007 | Hoffmann et al. | 370/464 |

* cited by examiner

*Primary Examiner*—Tan Trinh
(74) *Attorney, Agent, or Firm*—Volpe and Koenig, P.C.

(57) ABSTRACT

A method and apparatus for reducing transient impacts of beam switching in a switched beam antenna system are disclosed, a switch beam antenna system generates a plurality of beams in a predefined beam pattern and switches the current beam position to one of the plurality of predefined beams in accordance with measurement results for each of the beams, quality of signals is periodically measured for each of the plurality of predefined beams, and the best beam is determined, the current beam is switched to either the best beam or an intermediate beam in accordance with the separation between the best beam and the current beam.

27 Claims, 2 Drawing Sheets

METHOD AND APPARATUS FOR REDUCING TRANSIENT IMPACTS OF BEAM SWITCHING IN A SWITCHED BEAM ANTENNA SYSTEM

CROSS REFERENCE TO RELATED APPLICATIONS

This application claims the benefit of U.S. Provisional Application No. 60/542,765 filed Feb. 6, 2004, which is incorporated by reference as if fully set forth.

FIELD OF INVENTION

The present invention is related to wireless communication systems. More particularly, the present invention is a method and apparatus for reducing transient impacts of beam switching in a switched beam antenna system.

BACKGROUND

One of the most important issues in wireless communication is how to improve the capacity of the wireless communication system. One of the new areas being explored is the use of directional beam antennas to improve the link margin of the forward and reverse links between base stations and wireless transmit/receive units (WTRUs). The increased gain of the directional antenna over the typical omni-directional antenna provides an increased received signal gain at the WTRU and the base station.

A switched beam antenna system is a system where a number of fixed directional beams are defined and a transceiver selects a directional beam that provides the greatest signal quality and the least interference. The use of a switched beam antenna system can provide a number of benefits such as reduced transmit power, longer battery life for a WTRU, higher data rates at cell edge, and better network capacity. The use of a switched beam antenna requires signal level measurements on each of the predefined beams in order to select the best beam of the antenna. A WTRU or a base station must continually monitor the received signal level in each of the beam modes and periodically reselect the best beam to accommodate environment changes and movement of the WTRU.

At the time a beam is switched, however, there are abrupt changes in the received signal and the required transmit and receive power. This can result in receiver performance degradation. It can also result in a near/far problem because the transmission power could be too high or too low. Even though these effects are transient and will usually be corrected over time, it is desirable to minimize these effects. The impacts are likely to be more pronounced when switching between beams that are far apart in a predefined beam pattern, such as switching directly from a left beam to a right beam in a three-beam system.

SUMMARY

The present invention is a method and apparatus for reducing the impacts of transients due to beam switching in a switched beam antenna system. The present invention introduces a method that solves problems resulting from abrupt changes in the received signal power caused by beam switching in the switched beam antenna system. A switched beam antenna system generates a plurality of predefined beams and switches the beam position to one of the plurality of predefined beams in accordance with measurement results for each of the beams. The quality of received signals is periodically measured for each of the plurality of predefined beams. It is then determined whether a best beam as determined by the measurements is different from a current beam. If the current beam is different from the best beam, the current beam is switched to either the best beam or an intermediate beam located between the best beam and the current beam in the predefined beam pattern depending on the separation between the best beam and the current beam.

DETAILED DESCRIPTION OF THE PREFERRED EMBODIMENTS

Hereafter, the terminology "WTRU" includes but is not limited to a user equipment, a mobile station, a fixed or mobile subscriber unit, a pager, a wireless local area network client station, or any other type of device capable of operating in a wireless environment. When referred to hereafter, the terminology "base station" includes but is not limited to a Node-B, a site controller, an access point or any other type of interfacing device in a wireless environment.

The features of the present invention may be incorporated into an integrated circuit (IC) or be configured in a circuit comprising a multitude of interconnecting components. The features of the present invention may also be implemented as software or as a hardware/software combination.

Figure 1:
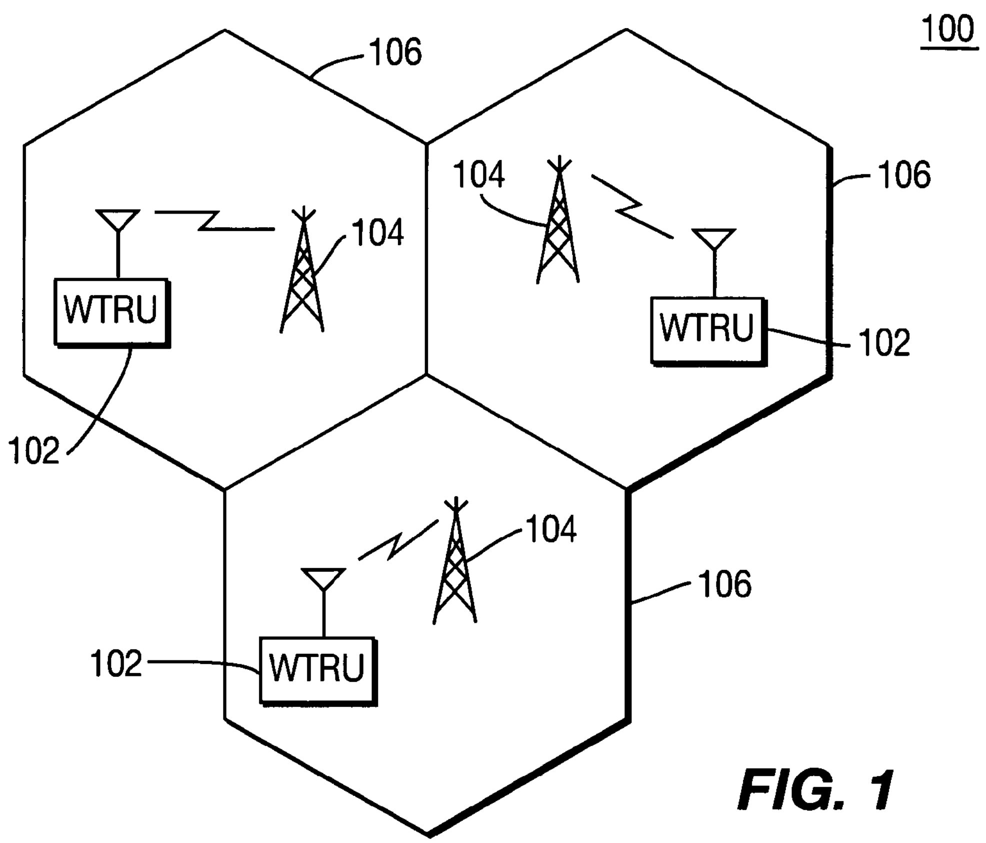
FIG. 1 is a diagram of a wireless communication system in accordance with the present invention.

FIG. 1 is a wireless communication system 100 in accordance with the present invention. The wireless communication system 100 comprises a plurality of base stations 104 and WTRUs 102. Each of the base stations 104 serves a cell 106. The WTRU 102 is registered with one cell 106 for communication. The WTRU 102 initially chooses one cell, but based on the technology, the WTRU 102 may later communicate with multiple cells (for example, for soft combining in a CDMA system). The present invention should not be constrained to be limited to single cell communication, but may be applied to multiple cell communication. Either the WTRU 102 or the base station 104, or both, is equipped with a switched beam antenna to generate a plurality of directional beams. The beams may or may not be generated in a predefined beam pattern, and an omni-directional pattern may also be generated in addition to the directional beams. The directional beams may be non-uniform so that one beam may be wider than the other beam and separations in azimuth between beams may or may not be the same. The WTRU 102 or the base station 104 may generate more than one beam simultaneously and steer each beam to the best beam position, respectively. The beam position may be switched to either one of the plurality of directional beams or the omni-directional pattern.

Figure 2:
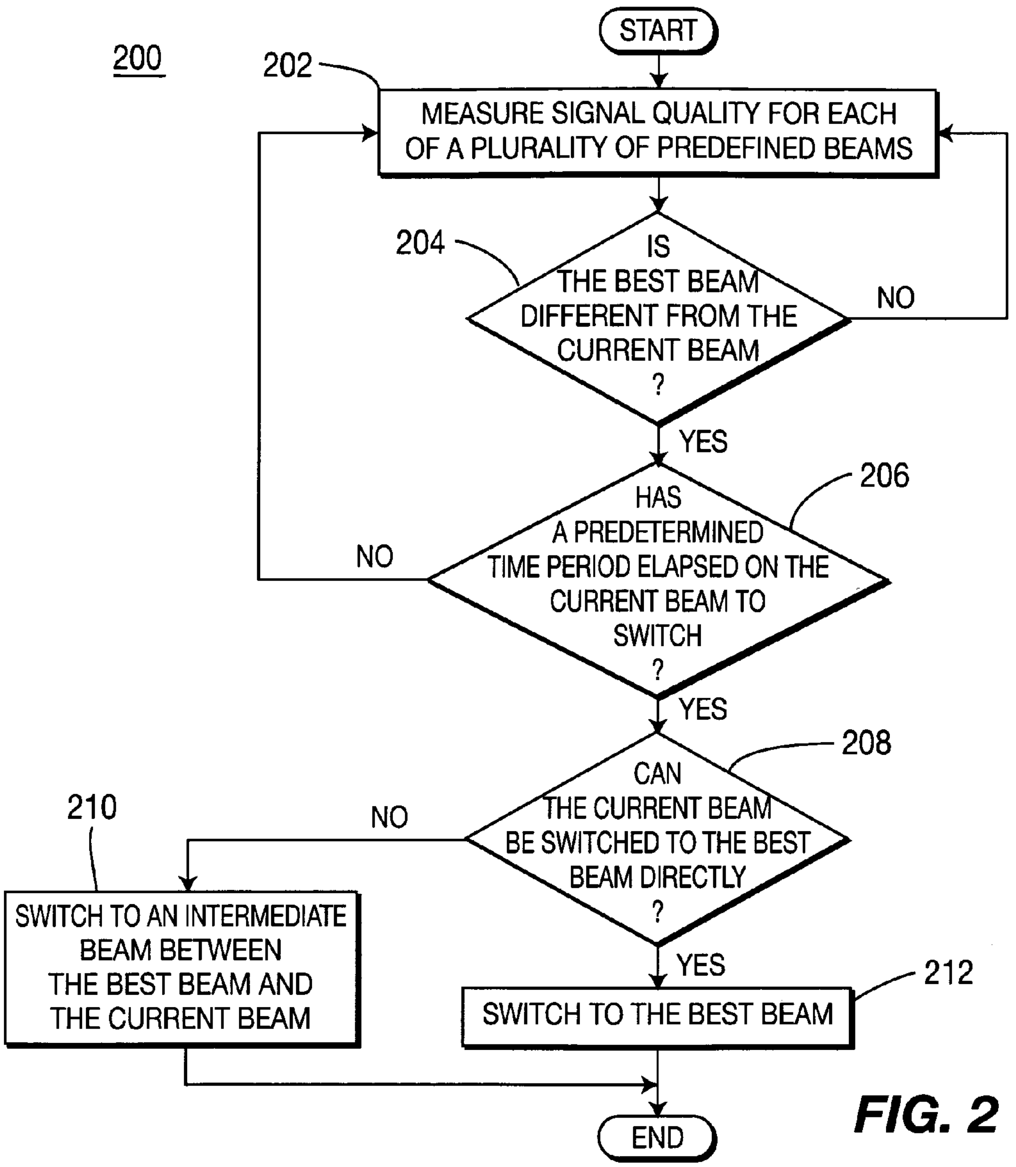
FIG. 2 is a flow diagram of a process for reducing transient impacts of beam switching in a switched beam antenna system in accordance with the present invention.

FIG. 2 is a flow diagram of a process 200 for reducing the impacts of transients due to beam switching in a switched beam antenna system in accordance with the present invention. Hereafter, the present invention will be explained only with reference to a WTRU. However, it should be understood that the present invention may also be implemented in a base station.

When a WTRU 102 is registered with one of the cells, the WTRU 102 selects one of the plurality of predefined beams, (i.e., a directional beam or an omni-directional pattern) and communicates with a base station 104 with the selected beam, (hereinafter, the "current beam"). Once the process 200 is initiated, the WTRU 102 monitors channel quality while switching the beam to each of the plurality of predefined beams (step 202). The start of the process 200 may be initiated with a triggering signal, (such as a timer), or may be periodic, non-periodic or continuous. If the process 200 is continuous, a new process is automatically initiated when the process reaches the end.

The WTRU 102 registers with one cell first and picks a beam. Later the WTRU 102 may communicate with multiple cells (e.g., for soft combining in CDMA system) and selects the best beam while communicating with multiple cells.

The WTRU 102 then determines whether the best beam as determined by the channel quality measurements is different from the current beam which is currently utilized in communication to the registered base station 104 (step 204). If the best beam is different from the current beam, the WTRU 102 initiates a beam switching procedure. If the current beam is the best beam, the current beam is maintained.

Optionally, the WTRU 102 may first determine before switching the beam whether a predetermined time period has elapsed since the beam has been switched to the current beam in order to prevent too frequent beam switching (step 206). If the predetermined time period on the current beam has elapsed, the process 200 proceeds to step 208 to switch the beam. If the predetermined time period has not elapsed, the process 200 returns to step 202.

Before switching the current beam to the best beam, the WTRU 102 determines whether the current beam can be switched to the best beam directly. If the current beam can be switched to the best beam directly, the current beam is switched to the best beam directly (step 212). As will be explained in greater detail hereinafter, if the current beam cannot be switched to the best beam directly, the current beam is switched to an intermediate beam which is located between the current beam and the best beam (step 210).

At step 208, the process 200 makes the determination based on the beam separation between the current beam and the best beam and, optionally, certain factors, including, but not limited to, channel state information and signal quality measurements. If the beam separation between the current beam and the best beam exceeds a threshold which could be predetermined or, optionally, dependent on certain factors, including, but not limited to, channel state information and signal quality measurements, the process 200 determines that the current beam cannot be switched to the best beam directly.

Figure 3:
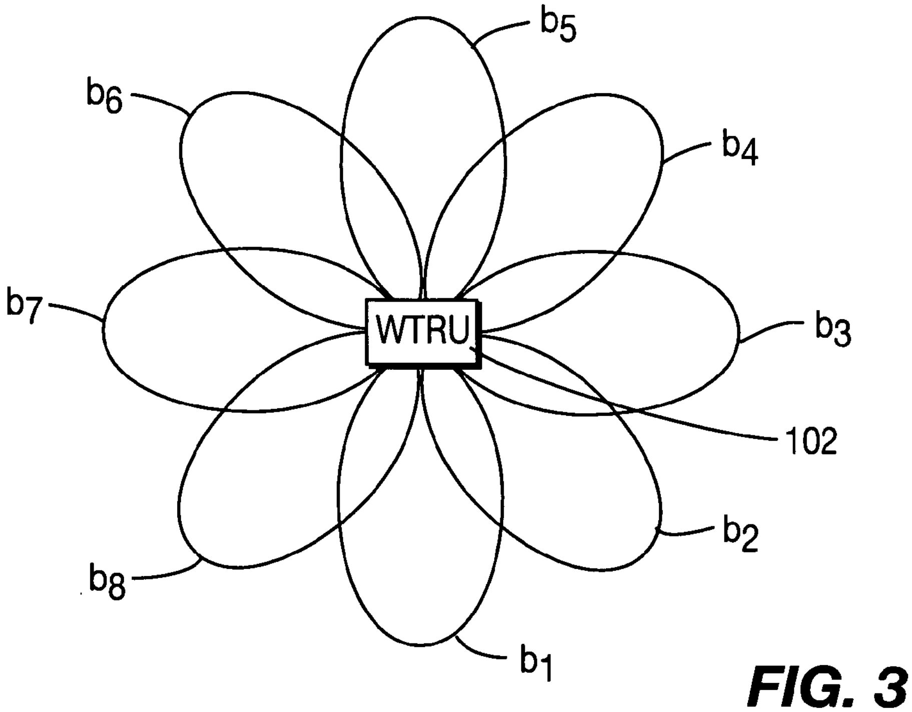
FIG. 3 is an example of a beam pattern generated by a switched beam antenna system in accordance with the present invention.

As a simple example, if the plurality of beams are generated in a predetermined beam pattern whereby the beams are of equal width and are equally spaced by a number of degrees called 1 step, the process 200 can make the determination based on the steps of separation between the best beam and the current beam in the predefined beam pattern (since steps ×fixed spacing is equal to the beam separation between the current beam and the best beam). FIG. 3 is an example of a predefined beam pattern of a plurality of directional beams. In FIG. 3, all eight (8) beams $b_1$-$b_8$ are predefined and are equal width and equally spaced by 1 step. However, it should be noted that FIG. 3 is provided just as an example, and any number of beams may be utilized and the present invention should not be construed to be limited to any particular number of beams. Equal width and equal spacing is also provided just as an example and the present invention should not be construed to be limited to equal width and equally spaced beams. Assuming that beam $b_1$ is the current beam and that beam $b_5$ turned out to be the best beam after channel quality measurements, the WTRU 102 determines the number of steps between the beam $b_1$ and beam $b_5$, (i.e., four steps). If this separation is more than a predetermined number of steps (i.e., more than a predetermined beam spacing), the WTRU 102 avoids switching the beam directly from beam $b_1$ to beam $b_5$. Instead, the WTRU 102 switches the beam to an intermediate beam between beam $b_1$ and beam $b_5$. If this separation is within the predetermined steps, the WTRU 102 directly switches the beam from $b_1$ to beam $b_5$. It should be noted that having a predetermined beam separation threshold for switching directly to the best beam is just an example and that the present invention should not be construed to be limited to predetermined thresholds.

Optionally, a beam closer to the current beam may be selected as an intermediate beam for transitioning from current beam to the best beam, since the beam that is closer to the current beam is more likely to be compatible with the current receiver parameters such as channel coefficient estimates. Choosing one closer to the current beam will likely reduce transients more, but result in slower switching to the best beam. Therefore, choosing the intermediate beam(s) between the current beam and the best beam is a tradeoff between less transients and faster switching, which will be described in detail hereinafter.

The beam switching pattern may be determined based on a trade-off between the performance impacts of slowing the beam switching process versus the performance impacts of abrupt switching. In an example of FIG. 3 where the system utilizes eight beams, the beam switching pattern from beam $b_1$ to beam $b_5$ may be $b_1$-$b_2$-$b_3$-$b_4$-$b_5$ or $b_1$-$b_3$-$b_5$, depending on the performance requirements. It should be noted that the foregoing switching pattern is provided just as an example, not as a limitation, and the beam switching pattern does not have to be equally spaced, but may be any pattern, such as $b_1$, $b_2$, $b_5$, or $b_1$, $b_2$, $b_4$, $b_5$ and some beams may be wider than others.

This gradual switching improves performance of the WTRU 102 receiver. For example, in a code division multiple access (CDMA) RAKE receiver, the gradual switching would likely allow for more paths of the RAKE fingers to be demodulated successfully without being totally off in channel coefficient estimates while switching a beam.

The intermediate beam in beam switching between two directional beams may be an omni-directional pattern. For example, assuming that a system utilizes three (3) beams, (i.e., a right beam, an omni-directional pattern, and a left beam) and that a left beam is a current beam and that a right beam is determined to be the best beam, the WTRU 102 avoids switching directly from the left beam to the right beam. Instead, the WTRU 102 switches first from the left beam to the omni-directional pattern, and then switches from the omni-directional pattern to the right beam. The method of the present invention can be applied to cases where more than three beams are utilized.

Figure 4:
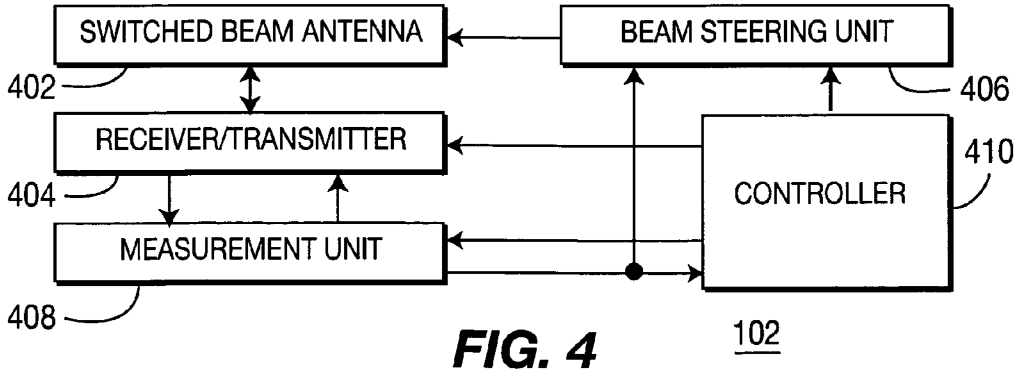
FIG. 4 is a block diagram of an apparatus configured to reduce transient impacts of beam switching in a switched beam antenna system in accordance with the present invention.

FIG. 4 is a block diagram of an apparatus 400 configured to reduce transient impacts of beam switching in a switched beam antenna system in accordance with the present invention. The apparatus 400 comprises a switched beam antenna 402, a beam steering unit 406, a receiver/transmitter 404, a measurement unit 408 and a controller 410. The switched beam antenna 402 comprises a plurality of antenna elements for generating a plurality of directional beams in addition to, optionally, an omni-directional pattern. The beam steering unit 406 is for steering a current beam to one of the plurality of directional beams or to the omni-directional pattern. The receiver/transmitter 404 receives signals from the switched beam antenna 402 and feeds them to the measurement unit 408. The measurement unit 408 is a part of base band processing units and for measuring quality of signals received from the switched beam antenna 402. The controller 410 controls all the elements of the apparatus 400 and the procedures for switching beams described hereinbefore.

The present invention is not limited to a two dimensional beam switching. The present invention is also applicable to a beam switching in three-dimensional spaces. The present invention is not limited to a single antenna system, but is applicable to a multi-antenna system, where more than one beam is controlled simultaneously.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for beam switching in a switched beam antenna, the method comprising:

measuring quality of signals for each of a plurality of predefined beams;

determining whether a best beam determined by the measurements is different from a current beam;

determining whether the current beam can be switched to the best beam directly based on the amount of separation between the current beam and the best beam in a predetermined beam pattern if the best beam is different from the current beam; and switching the current beam to the best beam directly if the current beam can be switched to the best beam directly, otherwise switching the current beam to an intermediate beam located between the current beam and the best beam.

2. The method of claim 1 further comprising determining whether a predetermined time period has elapsed since a beam is switched to the current beam, wherein the beam is switched only if the predetermined time period has elapsed.

3. The method of claim 1 wherein the intermediate beam is a beam closer to the current beam than the best beam.

4. The method of claim 1 wherein the intermediate beam is an omni-directional pattern.

5. The method of claim 1 wherein the beam is switched in three-dimensional spaces.

6. The method of claim 1 wherein the beam is switched in two-dimensional spaces.

7. The method of claim 1 wherein more than one beam is processed simultaneously, whereby each beam is switched to a best beam for each beam, respectively.

8. The method of claim 1 wherein the beam switching determination is further based on at least one of signal quality and channel state.

9. The method of claim 1 wherein the switched beam antenna comprises a single antenna.

10. The method of claim 1 wherein the switched beam antenna comprises multiple antennas.

11. The method of claim 1 wherein signal quality measurement and beam switching based on the signal quality measurement are continuously performed.

12. The method of claim 1 wherein signal quality measurement and beam switching based on the signal quality measurement are periodically performed.

13. The method of claim 1 wherein signal quality measurement and beam switching based on the signal quality measurement initiated with a triggering signal.

14. An apparatus for beam switching in a switch beam antenna, the apparatus comprising:

a switched beam antenna for generating a plurality of predefined beams;

a beam steering unit for steering a beam to one of the plurality of beams;

a transmitter/receiver for transmitting and receiving signals via the switched beam antenna;

a measurement unit for measuring quality of signals for each of the plurality of predefined beams; and a controller for controlling the beam steering unit, the transmitter/receiver and the measurement unit, wherein the controller is configured to determine a best beam among the plurality of predefined beams, determine whether a current beam can be switched to the best beam based on the amount of separation between the current beam and the best beam in a predefined beam pattern, and switch the current beam either to the best beam or an intermediate beam located between the best beam and the current beam in accordance with separation between the best beam and the current beam.

15. The apparatus of claim 14 wherein the controller determines whether a predetermined time period has elapsed since a beam is switched to the current beam, wherein the controller switches a beam to the best beam only if the predetermined time period has elapsed.

16. The apparatus of claim 14 wherein the intermediate beam is a beam closer to the current beam than the best beam.

17. The apparatus of claim 14 wherein the intermediate beam is an omni-directional pattern.

18. The apparatus of claim 14 wherein the beam is switched in three-dimensional spaces.

19. The apparatus of claim 14 wherein the beam is switched in two-dimensional spaces.

20. The apparatus of claim 14 wherein the apparatus is a base station.

21. The apparatus of claim 17 wherein the beam switching determination is further based on at least one of signal quality and channel state.

22. The apparatus of claim 14 wherein the apparatus is a wireless transmit/receive unit.

23. The apparatus of claim 14 wherein the switched beam antenna comprises a single antenna.

24. The apparatus of claim 14 wherein the switched beam antenna comprises multiple antennas.

25. The apparatus of claim 14 wherein the controller makes a beam switching decision based on the quality of signal measurement continuously.

26. The apparatus of claim 14 wherein the controller makes a beam switching decision based on the quality of signal measurement periodically.

27. The apparatus of claim 14 wherein quality of signal measurement and beam switching are initiated with a triggering signal.

* * * * *

UNITED STATES PATENT AND TRADEMARK OFFICE

CERTIFICATE OF CORRECTION

PATENT NO. : 7,430,440 B2
APPLICATION NO. : 11/019437
DATED : September 30, 2008
INVENTOR(S) : Grandhi et al.

It is certified that error appears in the above-identified patent and that said Letters Patent is hereby corrected as shown below:

Column 1, line 17, after the word "for" delete "rcducing transicnt impacts of bcam" and insert therefor --reducing transient impacts of beam--.

Column 1, delete line 28, and insert therefor --of the directional antenna over the typical omni-directional--.

Column 1, delete line 51, and insert therefor --time, it is desirable to minimize these effects. The impacts are--.

Column 1, delete line 62, and insert therefor --duces a method that solves problems resulting from abrupt--.

Column 2, delete line 17, and insert therefor --tem in accordance with the present invention--.

Column 3, line 25, before the words "the registered" delete "to" and insert therefor --with--.

Column 3, delete line 51, and insert therefor --beam and the best beam exceeds a threshold which could be--.

Column 3, delete line 62, and insert therefor --x fixed spacing is--.

Column 4, delete line 51, and insert therefor --directional beams may be an omni-directional pattern. For--.

Column 4, line 62, before the word "to" delete "configurcd" and insert therefor --configured--.

Column 5, delete line 18, and insert therefor --beam is controlled simultaneously.--.

Column 5, delete line 22, and insert therefor --without the other features and elements of the preferred--.

Claim 1, column 5, delete line 27, and insert therefor --1. A method for beam switching in a switched beam--.

Claim 21, column 6, line 46, before the word "wherein", delete "17" and insert therefor --14--.

Claim 23, column 6, delete line 51, and insert therefor --23. The apparatus of claim 14 wherein the switched beam--.

Claim 27, column 6, delete line 62, and insert therefor --measurement and beam switching are initiated with a trigger- --.

Signed and Sealed this

Sixteenth Day of February, 2010

David J. Kappos

David J. Kappos
*Director of the United States Patent and Trademark Office*